W. W. LUMMUS.
Hydraulic Surface Measuring Machine.

No. 233,361. Patented Oct. 19, 1880.

WITNESSES.
S. R. Havens
L. E. Bacheller

INVENTOR.
W. W. Lummus

United States Patent Office.

WILLIAM W. LUMMUS, OF LYNN, MASSACHUSETTS.

HYDRAULIC SURFACE-MEASURING MACHINE.

SPECIFICATION forming part of Letters Patent No. 233,361, dated October 19, 1880.

Application filed February 11, 1880.

*To all whom it may concern:*

Be it known that I, WILLIAM W. LUMMUS, of Lynn, in the county of Essex and State of Massachusetts, have invented a new and useful Hydraulic Surface-Measuring Machine, of which the following, taken in connection with the accompanying drawings, is a specification.

Figure 1:
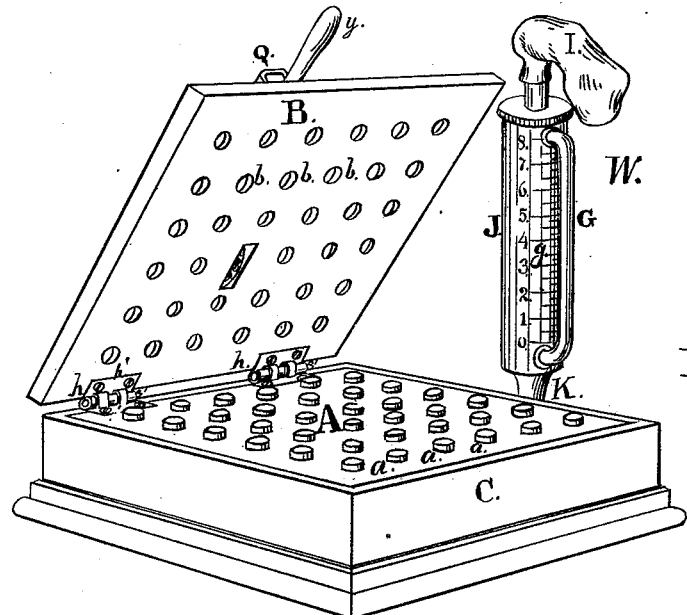
Figure 2:
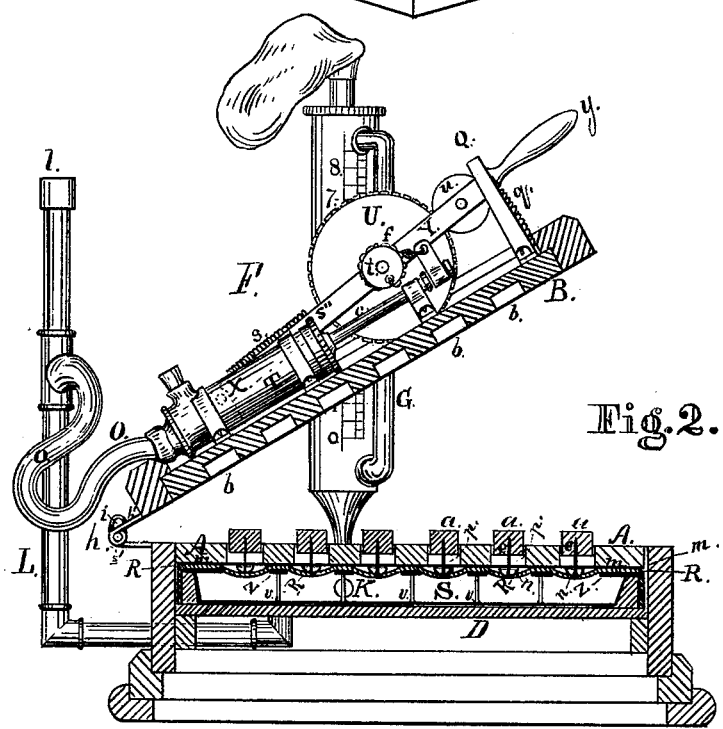

In the drawings, Figure 1 is a perspective view of the machine. Fig. 2 is a vertical section, showing the interior construction.

The object of my invention is to furnish a machine for measuring leather and skins in a more certain and accurate manner than has heretofore been done by machinery, and also for measuring other thin and flat material, if required.

So far as I am aware all other machines for this purpose are in the nature of scales or weighing-machines, wherein it is found difficult to obtain accurate or satisfactory results, owing, in great part, to the inertia of the heavy platform or lid, which is weighed. In the machine I have invented this fault does not exist, as it operates by displacement of fluid, and upon hydraulic principles only. For each square inch or unit of surface measured there is a certain unit of fluid displaced, and the aggregate of fluid so displaced is made to raise a column of fluid in a tube or receiver, to which is attached a glass tube and graduated scale, like a common thermometer, and upon this is shown, as the fluid rises in the tube, the number of units of surface upon the object measured.

In some cases I use, in addition to the tubes and scales, a mechanism for printing the measurement upon the material as it is measured, which mechanism is hereinafter described.

The construction and operation of my machine are as follows:

In the drawings, Fig. 1 shows the machine in position to receive the material to be measured, wherein A is a table having a rising lid, B, and both are perforated with holes *b b*, Fig. 2, spaced at any required distance apart over their whole areas, those in the lid being immediately over those in the table and of the same size. The more frequently these holes are spaced the more accurate the measurements obtained will be; but I find in practice that if the holes are nine-sixteenths of an inch bore and spaced one inch on centers the results are sufficiently accurate.

Surrounding the table is a base, C, which incloses a fluid-chamber, S, Fig. 2, beneath the table, as shown in Fig. 2.

The table A is preferably of boards three-fourths of an inch thick, and the holes therein are loosely filled with small wooden plugs, *a a*, Figs. 1 and 2, of half-inch diameter, and length equal to the thickness of the table. On the under side of the table is a metallic sheet, preferably of zinc, *m m*, Fig. 2, attached to the table and perforated with holes one-eighth of an inch in diameter, concentric with those in the table. Through these holes the stems of round-headed brass nails or tacks *n n* are passed upward and fixed firmly in the centers of the plugs *a a*, as seen at *e e*, Fig. 2, leaving a distance of three-eighths of an inch between the brass nail-heads and the lower ends of the plugs, so that when the nail-head is pressed upward against the metallic sheet the plug shall be thereby raised, so that its top shall stand three-eighths of an inch above the upper surface of the table.

The purpose of the metallic plate and brass nails is to prevent the plugs from being pushed upward too far by pressure from below upon the nail-heads, and to prevent them from sinking below the level of the table when pressed from above by the material being measured.

The round-head nails are driven into the plugs to a uniform distance, which may be more or less, as required. Below the nail-heads thus suspended is a fluid-reservoir, S, Fig. 2, made shallow, as practicable, preferably about three-fourths of an inch deep, by the whole area of the table, and made of tinned copper or any suitable material. Standing in this reservoir or tray is a platform or staging, of sheet metal, Z Z, level with the top of the rim of the reservoir, and supported by small metallic posts, *v v v*, Fig. 2. This platform is also perforated with holes *p p*, immediately below and concentric with those in the table and lid above, but of greater diameter, being about three-fourths of an inch bore.

The metallic posts *v v* are of wire soldered to the bottom of the tray beneath the staging Z, and spaced between the holes *p p*.

Above the platform or stage, and covering the entire reservoir, is drawn a sheet of rubber, R, and secured around the edges of the reservoir by any convenient means, preferably by cement, forming a complete water-tight chamber or reservoir, which is placed immediately below the table, so that the round-head nails n n depress the rubber sheet R in the holes p p, as shown in Fig. 2.

From the fluid-chamber S a pipe, K, is projected outward through the base C, Fig. 1, and connects with a device, W, for indicating the measurement. This device or indicator consists of an upright metallic tube, J, of sufficient size to admit and contain any amount of fluid likely to be displaced from the vessel S.

Connecting at top and bottom with the tube J, and attached to the outside surface of the same, is a smaller glass tube, G, which, like a water-indicator upon a steam-boiler, is to exhibit the rising of fluid in the tube J, and closely adjoining the glass tube is a graduated scale, g, engraved, marked, or printed, as may be preferred, and so graduated and adjusted as to show by the height of the fluid-column in the glass tube the number of feet of area upon the material being measured.

Upon the top of the tube J is placed a thin rubber cap or cowl, I, which, by its elasticity, yields to the volume of air displaced by the rising fluid in the tube J, and at the same time prevents evaporation and overflow from the tube, and assists in restoring its equilibrium after the lid is closed upon the material which is being measured, which act is likely to cause a sudden rise and commotion of the fluid in the tube J.

The fluid-chamber S is filled with some colored liquid through the pipe L, which enters the chamber opposite the pipe K, and is capped by a water-tight nipple, l, after it is filled. Enough fluid should be poured into the pipe L to raise the column in the glass tube G to the zero-point upon the scale g.

In addition to the indicator W, I sometimes use a stamping apparatus, F, Fig. 2, which consists of a cylinder, T, connecting by a flexible pipe, O, to the pipe L, a piston having a piston-rod, c, from the outer end of which the end of a small chain, f, is attached, which chain, returning, winds upon the axle t of the stamp-wheel U, which wheel has upon its periphery a system of figures in raised type, and is placed between the arms of a forked lever, Y. This lever is attached to the lid at X, and by it the operator depresses the stamp-wheel U upon the material which is being measured by means of the handle y.

The type-figures upon the stamp-wheel U are spaced and graduated so as to print feet and fractional parts of a foot. An upright standard, Q, keeps the lever in position, being slotted vertically, so that the lever Y works up and down in the slot upborne by the spiral spring q. An inking-roller, u, is placed between the branches of the forked lever Y, and in contact with the types upon the periphery of the wheel U. This wheel U works through a slot cut through the lid B. A spiral spring, s, secured to the lever at s'', is connected to a small chain, also winding upon the axle t in contrary direction from the chain f, so as to restore the wheel to its position after stamping or printing.

The operation of my invention is as follows: The material to be measured is placed flat upon the table and resting upon the tops of the small plugs, which are sustained by the upward pressure of the fluid upon the rubber sheet R, as also by the elasticity of the rubber itself. Upon lowering the lid every plug covered by the said material to be measured will be depressed, and those not so covered will remain and enter the holes in the lid. Every plug depressed sinks the brass nail-head into and against the rubber sheet R, causing it to form an inverted conical depression through the holes p p into the fluid-chamber S, thereby displacing a certain unit of fluid, and the aggregate of such displacement of fluid will rise through the pipe K, partly into the tube J, and a part will also enter into the cylinder T through the flexible pipe O, and the required measurement will be exhibited in feet upon the glass tube G and scale g, and may be printed upon the measured material by pressing downward the lever Y.

In practice I sometimes make the whole of the water or fluid chamber S, together with the staging or platform Z, of hardened rubber, which facilitates construction, and is a better material upon which to cement the sheet-rubber R. In either case a firm and level support is given to the water-chamber by the floor D.

In order to have the lid B, when closed, bear evenly upon the article being measured, and adjust itself to the various thicknesses, I construct the fixed part of the hinge h with an upright slot part, i, in which the pintle of the part attached to the lid may rise or drop vertically as the lid shuts down upon the said article.

Having thus explained my machine, I would claim—

1. The method herein described of measuring the area of flat material, by causing the said material to produce a displacement varying with its area through suitable mechanism in a fluid contained in a chamber, and the measuring by an indicating mechanism of the amount of fluid displaced by the said material, substantially as described.

2. The method herein described of measuring the area of flat material and indicating its area by figures, by causing the said material to produce a displacement varying with its area through suitable mechanism in a fluid contained in a chamber, and the measuring by an indicating mechanism of the amount of fluid displaced, and the movement of the type to indicate its area by the displaced fluid, substantially as described.

3. The combination, with a fluid-reservoir provided with an elastic diaphragm, of a compressing mechanism whose pressing-surface varies with the area of the article being measured, and a mechanism indicating the amount of fluid displaced, whereby a flat material may be measured, substantially as described.

4. The combination, with the perforated table A, provided with a fluid-chamber, S, an elastic diaphragm, R, and sliding plugs $a$, of the perforated lid B and indicator J, substantially as described, and for the purpose set forth.

5. The combination of the perforated table A, fluid-chamber S, elastic diaphragm R, plugs $a$, and lid B with the tube L, pipe O, cylinder T, piston-rod C, chain $f$, and revolving type-wheel U, substantially as described, and for the purpose set forth.

6. The rubber sheet R, in combination with numerous depressing-points, $n\ n$, actuated, in greater or less number, by the area of the material being measured, and the perforated supporting-platform Z, and a hydraulic mechanism, W, for indicating the area of such material when so measured.

7. The fluid-reservoir S, in combination with the rubber R, and the depressing-points $n\ n$ and device W, for indicating the area of the article measured.

8. A mechanism, F, for printing or stamping upon the article measured its area, actuated by the hydraulic pressure of a fluid displaced in various amounts by and according to the area of said article measured, in combination with the reservoir S and the depressing-points $n\ n$.

9. The printing or stamping wheel U, in combination with the cylinder T and its piston, fluid-reservoir S, and depressing-points $n\ n$, and operated by the pressure of displaced fluid, substantially as described.

10. The combination, with the perforated table A, provided with a fluid-chamber, S, an elastic diaphragm, R, sliding plugs $a$, and hinged leaves $h$, having slotted end pieces, $i$, of the perforated lid B, having leaves $h'$ and sliding pintles $s'$, substantially as described, and for the purpose set forth.

Executed at Boston, Massachusetts, this 16th day of January, A. D. 1880.

WILLIAM W. LUMMUS.

Witnesses:
 E. A. HEMMENWAY,
 C. H. DODD.